United States Patent
Bar-Zeev et al.

(10) Patent No.: US 11,119,573 B2
(45) Date of Patent: Sep. 14, 2021

(54) PUPIL MODULATION AS A COGNITIVE CONTROL SIGNAL

(71) Applicant: Apple Inc., Cupertino, CA (US)

(72) Inventors: Avi Bar-Zeev, Oakland, CA (US); Devin W. Chalmers, Oakland, CA (US); Fletcher R. Rothkopf, Los Altos, CA (US); Grant H. Mulliken, San Jose, CA (US); Holly E. Gerhard, Cupertino, CA (US); Lilli I. Jonsson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/568,782

(22) Filed: Sep. 12, 2019

(65) Prior Publication Data

US 2020/0103967 A1 Apr. 2, 2020

Related U.S. Application Data

(60) Provisional application No. 62/738,031, filed on Sep. 28, 2018.

(51) Int. Cl.
*G06F 3/01* (2006.01)
*G06K 9/00* (2006.01)
(Continued)

(52) U.S. Cl.
CPC .............. *G06F 3/015* (2013.01); *G06F 3/147* (2013.01); *G06K 9/0061* (2013.01); *G06F 3/012* (2013.01);
(Continued)

(58) Field of Classification Search
CPC .......... G06F 3/147; G06F 3/012; G06F 3/015; G06F 3/013; G06F 3/017; G06F 3/167;
(Continued)

(56) References Cited

U.S. PATENT DOCUMENTS 8,994,613 B1 3/2015 Johnson et al.
9,123,050 B2 9/2015 Ryu et al.
(Continued)

OTHER PUBLICATIONS

PCT, European Patent Office (ISA/EP), Invitation to Pay Additional Fees, Results of the Partial International Search, and Provisional Opinion Accompanying the Partial Result, International Application No. PCT/US2019/050919, 18 pages, Dec. 18, 2019.
(Continued)

*Primary Examiner* — Abdul-Samad A Adediran
(74) *Attorney, Agent, or Firm* — Thompson Hine LLP

(57) ABSTRACT

One exemplary implementation provides an improved user experience on a device by using physiological data to initiate a user interaction for the user experience based on an identified interest or intention of a user. For example, a sensor may obtain physiological data (e.g., pupil diameter) of a user during a user experience in which content is displayed on a display. The physiological data varies over time during the user experience and a pattern is detected. The detected pattern is used to identify an interest of the user in the content or an intention of the user regarding the content. The user interaction is then initiated based on the identified interest or the identified intention.

24 Claims, 5 Drawing Sheets

(51) Int. Cl.
*G06F 3/147* (2006.01)
*G06F 3/16* (2006.01)

(52) U.S. Cl.
CPC ............. *G06F 3/013* (2013.01); *G06F 3/017* (2013.01); *G06F 3/167* (2013.01)

(58) Field of Classification Search
CPC ... H04N 19/00; G06K 9/00979; G06K 9/0061
See application file for complete search history.

(56) References Cited

U.S. PATENT DOCUMENTS

| | | | |
|---|---|---|---|
| 9,569,734 B2 | 2/2017 | Thieberger et al. | |
| 9,596,508 B2 | 3/2017 | McCoy et al. | |
| 10,134,084 B1* | 11/2018 | Gabriele | G06F 3/017 |
| 2015/0213634 A1 | 7/2015 | Karmarkar et al. | |
| 2015/0332166 A1 | 11/2015 | Ferens et al. | |
| 2017/0278122 A1* | 9/2017 | Kaehler | G06K 9/00979 |
| 2017/0290504 A1 | 10/2017 | Khaderi et al. | |
| 2017/0293356 A1* | 10/2017 | Khaderi | G06F 3/147 |
| 2018/0309955 A1* | 10/2018 | Lawrence | H04N 19/00 |
| 2019/0187787 A1* | 6/2019 | White | G06F 3/012 |

OTHER PUBLICATIONS

PCT, European Patent Office (ISA/EP), International Search Report and Written Opinion, International Application No. PCT/US2019/050919, 19 pages, Feb. 13, 2020.

* cited by examiner

PUPIL MODULATION AS A COGNITIVE CONTROL SIGNAL

CROSS-REFERENCE TO RELATED APPLICATION

This application claims the benefit of U.S. Provisional Application Ser. No. 62/738,031 filed Sep. 28, 2018, which is incorporated herein in its entirety.

TECHNICAL FIELD

The present disclosure generally relates to providing user experiences on electronic devices, and in particular, to systems, methods, and devices for using physiological data to improve a user experience.

BACKGROUND

Electronic devices have different capabilities with respect to viewing and interacting with electronic content. A variety of input mechanisms have been incorporated into a variety of user devices to provide functionality and user interaction (e.g., keyboards, mice, touchscreens, buttons, microphones for voice commands, optical sensors, etc.). For example, touch screens have been incorporated into mobile phones (e.g., smartphones), tablet computers, wearable devices (e.g., watches, glasses, head-mounted devices, etc.), and other computing devices, allowing software developers to create engaging software applications ("apps") for entertainment, productivity, health, and the like. In some instances, touch screens work in conjunction with a variety of other input mechanisms for interacting with a device (e.g., optical sensors, buttons, microphones for voice commands, etc.).

Many devices, however, can have limited device interaction and control capabilities due to device size constraints, display size constraints, operational constraints, etc. For example, small or thin user devices can have a limited number of physical buttons for receiving user input. Similarly, small user devices can have touchscreens with limited space for providing virtual buttons or other virtual user interface elements. In addition, some devices can have buttons or other interactive elements that are unnatural, cumbersome, or uncomfortable to use in certain positions or in certain operating conditions. For example, it may be cumbersome to interact with a device using both hands (e.g., holding a device in one hand while engaging interface elements with the other). In another example, it may be difficult to press small buttons or engage touchscreen functions while a user's hands are otherwise occupied or unavailable (e.g., when wearing gloves, carrying groceries, holding a child's hand, driving, etc.). In still other examples, device interaction can be limited in a variety of other ways.

SUMMARY

Various implementations disclosed herein include devices, systems, and methods that obtain physiological data (e.g., pupil dilation, electroencephalography, etc.) of a user during a user experience, in which content is displayed on a display, with one or more physiological sensors. The physiological data varies over time during the user experience and a pattern is detected. Moreover, in some implementations, the physiological data includes involuntary user responses. Dependent upon user privacy or opt-in/out settings, the detected pattern may be used to help or assist the user by identifying an interest of the user in the content or an intention of the user regarding the content. Identifying the intention may include, for example, identifying an intent to execute a movement, make a decision, or select a target in the content at a particular instant in time or in the future. Thus, a user interaction may be initiated based on the identified interest or the identified intention. In some implementations, the detected pattern is unique to the user and is stored in a user profile associated with the user. For example, the user profile may be used to provide a personalized user experience that identifies the user's interest or intention based upon the user's unique detected patterns.

In some implementations, the physiological data is pupil dilation data and represents a time-varying pupil diameter. Thus, the detected pattern may be a pupil dilation pattern. In some implementations, exogenous signals are accounted for when detecting the pupil dilation pattern. For example, exogenous signals may result from ambient light changes, chromatic changes, accommodation of the eye, content lighting changes, cyclical pupil dilations, changes in ambient noise, or changes in motion of the device. In some implementations, a machine learning technique is trained to identify patterns in physiological data corresponding to user interests or user intentions.

In some implementations, additional data is obtained, and the interest or intention is identified based on that data. The data may include, for example, a gesture of a body part detected by an image sensor during the user experience, a voice command of a voice detected by a sound sensor during the user experience, a fixed gaze detected by an eye sensor during the user experience, a sequence of gaze patterns detected by an eye sensor during the user experience, an orienting response (e.g., head movement), a movement detected by a motion sensor during the user experience, a facial expression detected by an image sensor during the user experience, or an attribute included in the content. In some implementations, the method includes identifying related interests or intentions based on previously identified interests or previously identified intentions during the user experience. In some implementations, the method includes determining a confidence in the identified interest or the identified intention based on previously identified interests or previously identified intentions during the user experience. In some implementations, data is received regarding a voluntary user movement (e.g., an arm movement) and the voluntary user movement is interpreted as an intention to interact with the content based on an involuntary characteristic of the user that is captured in the physiological data. For example, the user can use natural arm gestures and the gestures will only be recognized as intentional commands when the involuntary changes of the user's pupil reveal that intention. Moreover, identifying the interest may include identifying an interest in a particular object in content at a particular instant in time or in the future.

In some implementations progressive interfaces aid the usability of interactions supported by an involuntary characteristic of the user that is captured in the physiological data. For example, system feedback to the user may explicitly call out the use of a lower-confidence multimodal signal to begin a low-commitment interaction with some initial feedback to the user (e.g., highlighting or selecting an object, or displaying one or more menu items). Further input from the user in response to the low-commitment interaction may progressively lead to a higher-commitment action (e.g., acting on or deleting an item).

In some implementations initiating the user interaction includes providing additional content association with an object in the content, e.g., additional content corresponding to the identified interest or the identified intention. In some implementations, initiating the user interaction includes removing an object in the content based on the identified interest or the identified intention. In some implementations, initiating the user interaction includes automatically capturing images of the content at times during the user experience determined based on the identified interest or the identified intention.

In some implementations, detecting the pattern includes tracking a physiological attribute associated with the physiological data using a first sensor and activating a second sensor to obtain the physiological data based on the tracking. In some implementations, the device, e.g., a head-mounted-device, handheld device, laptop, or desktop, utilizes onboard sensors to obtain the physiological data and, in other implementations, the device includes a combination of multiple and physically separate devices and sensors.

In some implementations, informed consent is received from the user to obtain the physiological data and/or additional data. Moreover, a user may consent, opt-in/out to feature benefits, or select certain actions or types of action that may be invoked automatically based on physiological data. In some implementations, a prompt to consent includes a graphical cue rendered on a display portion of the device. For example, a graphical user interface may include a request for permission and an input portion that allows the user to input consent. In some implementations, a prompt to consent includes an audio cue generated. For example, the audio cue may include an audio segment explanatory of a request for permission and the consent may be received when the user issues a voice response that indicates consent.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, an image sensor, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 2:
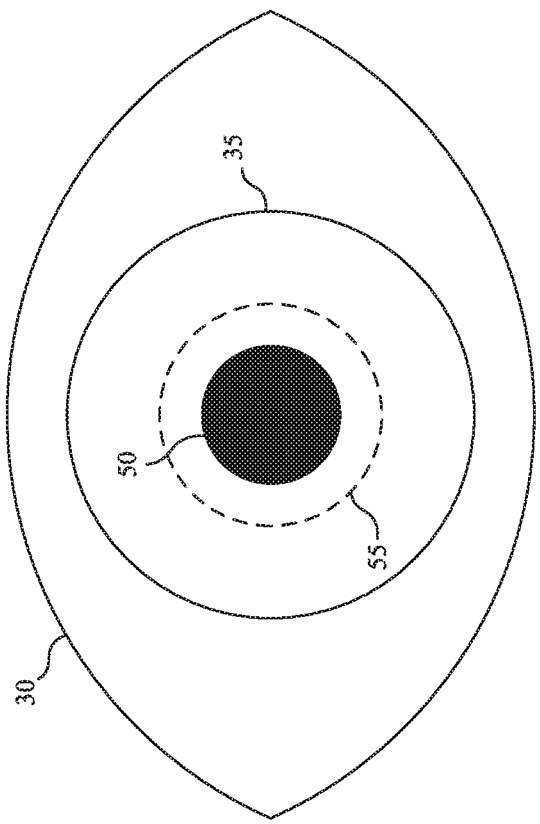
FIG. 2 illustrates a pupil of the user of FIG. 1 in which the diameter of the pupil varies with time.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
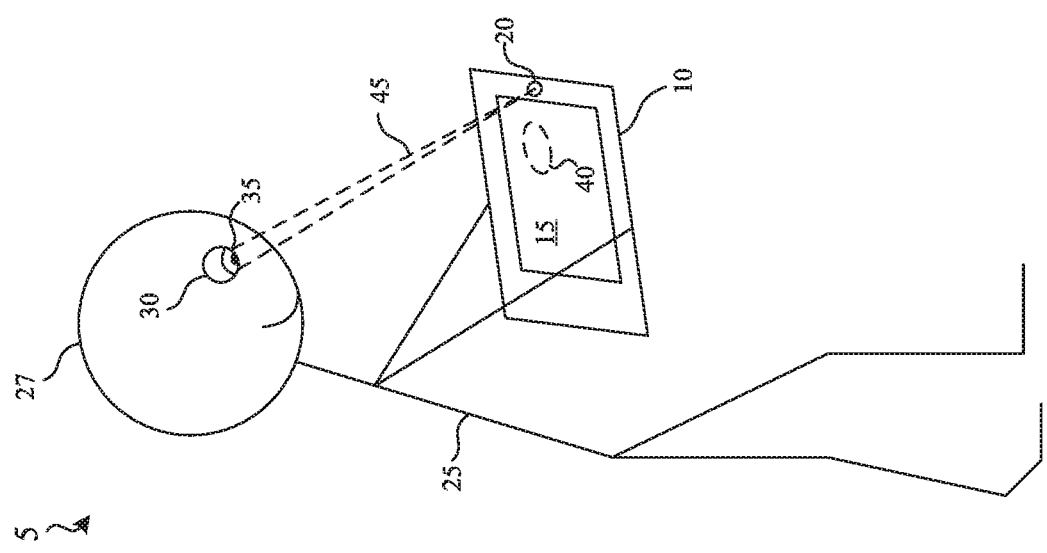
FIG. 1 illustrates a device displaying content and obtaining physiological data from a user in accordance with some implementations.

FIG. 1 illustrates a device 10 displaying content 15 and obtaining physiological data 45 from a user 25. While this example and other examples discussed herein illustrate a single device 10 in a real-world environment 5, the techniques disclosed herein are applicable to multiple devices as well as to other real-world environments. For example, the functions of device 10 may be performed by multiple devices. Furthermore, this example and other examples discussed herein operate under the assumption that the user 25 has provided informed consent to benefit from the techniques disclosed herein. For example, the user 25 may consent to the tracking or use of physiological data 45, opt-in/out to feature benefits, or select certain actions or types of action that may be invoked automatically by device 10 based on physiological data 45.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable head mounted display ("HMD").

In some implementations, the device 10 includes an eye tracking system for detecting eye position and eye movements. For example, an eye tracking system of an HMD may include one or more infrared ("IR") light-emitting diodes ("LEDs"), an eye tracking camera (e.g., near-IR ("NIR") camera), and an illumination source (e.g., an NIR light source) that emits light (e.g., NIR light) towards the eyes of the user 25. Moreover, the illumination source of the HMD may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation. For example, the point of gaze estimated from the eye tracking images may enable gaze-based interaction with content shown on the near-eye display of the HMD.

In some implementations, the device 10 has a graphical user interface ("GUI"), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, web site creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 presents an experience in which content 15 is displayed on a display of the device 10 during a user experience. A sensor 20 detects physiological data 45 of the user 25 during the user experience. In some implementations, the device 10 employs various physiological sensor, detection, or measurement systems. Detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data 45 in order to benefit from synchronous acquisition of physiological data 45. Moreover, in some implementations, the physiological data 45 represents involuntary data, i.e., responses that are not under conscious control. For example, a pupillary response may represent an involuntary movement.

In some implementations, one or both eyes 30 of the user 25, including one or both pupils 35 of the user 25 present physiological data 45 in the form of a pupillary response. The pupillary response of the user 25 results in a varying of the size or diameter of the pupil 35, via the optic and oculomotor cranial nerve. For example, the pupillary response may include a constriction response (miosis), i.e., a narrowing of the pupil, or a dilation response (mydriasis), i.e., a widening of the pupil. In some implementations, the device 10 may detect patterns of physiological data 45 representing a time-varying pupil diameter.

FIG. 2 illustrates a pupil 35 of the user 25 of FIG. 1 in which the diameter of the pupil 35 varies with time. As shown in FIG. 2, a present physiological state 50 may vary in contrast to a past physiological state 55. For example, the present physiological state may include a present pupil diameter and a past physiological state may include a past pupil diameter.

The physiological data 45 may vary in time and the device 10 may use the physiological data 45 to detect a pattern. In some implementations, the pattern is a change in physiological data 45 from one time to another time, and, in some other implementations, the pattern is series of changes in physiological data over a period of time. Based on detecting the pattern, the device 10 may assist user 25 by identifying an interest or intent 40 of the user 25 and may initiate a user interaction based on the identified interest or intent 40.

Figure 3A:
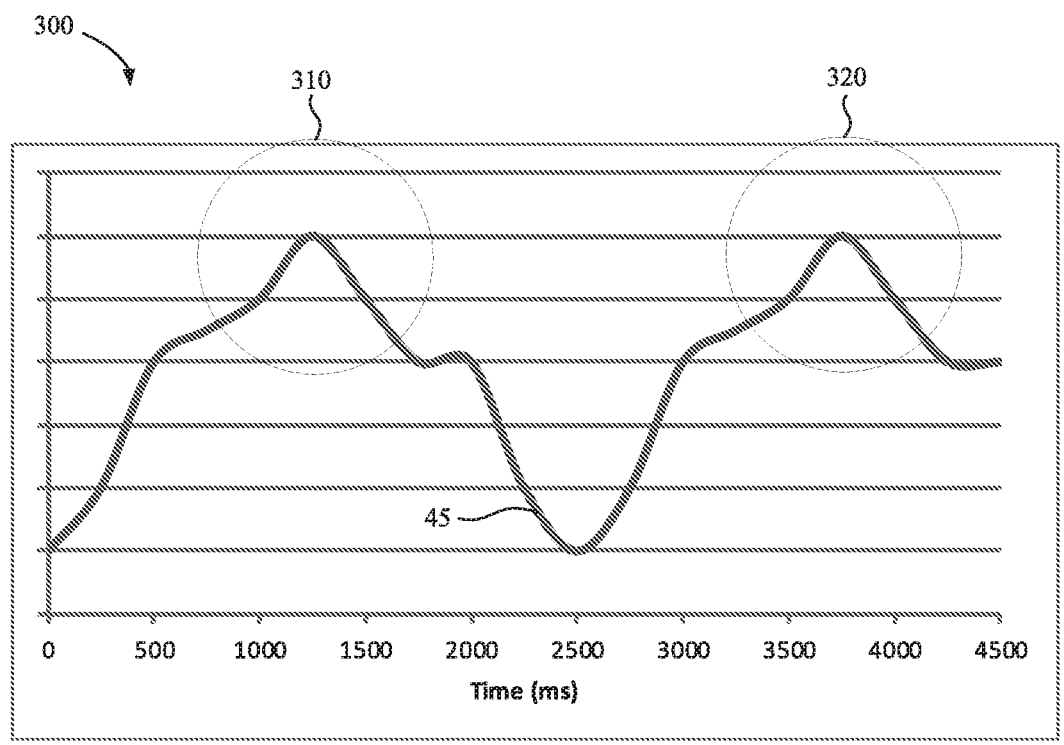
FIG. 3A is a chart illustrating detection of a pattern of physiological data in accordance with some implementations.

FIG. 3A is a chart 300 illustrating detection of a pattern of physiological data 45. Chart 300 illustrates a time-varying pattern 305 of physiological data 45, for example, an amount of pupil dilation (y-axis) over time (x-axis). The pattern 305 includes a peak pattern 310 that may be interpreted by device 10 as an indication of an interest or intent 40 of the user 25. In some implementations, the device 10 utilizes a model trained to determine that the peak pattern 310 indicates that the user 20 is involuntarily signaling interest or intent 40 during the time of the peak pattern 310, e.g., based on something the user is looking at or otherwise experiencing during that time period. In some implementations, a machine learning model (e.g., a trained neural network) is applied to identify patterns in physiological data 45. Moreover, the machine learning model may be used to match the patterns with learned patterns corresponding to indications of interest or intent 40. The device 10 may learn patterns specific to the particular user 25. For example, the device 10 may learn from determining that peak pattern 310 represents an indication of interest or intent of the user 25 and use this information to adapt the model to subsequently identify the similar peak pattern 320 as another indication of interest or intent of the user 25. Such learning can take into account the user's interactions that may confirm predictions of interest or intent, e.g., if the model predicts an intent to click a button and the user clicks the button, the model can be updated accordingly. As another example, the model may be trained or adapted based on the user imagining pressing a button, i.e., not physically pressing the button.

Figure 3B:
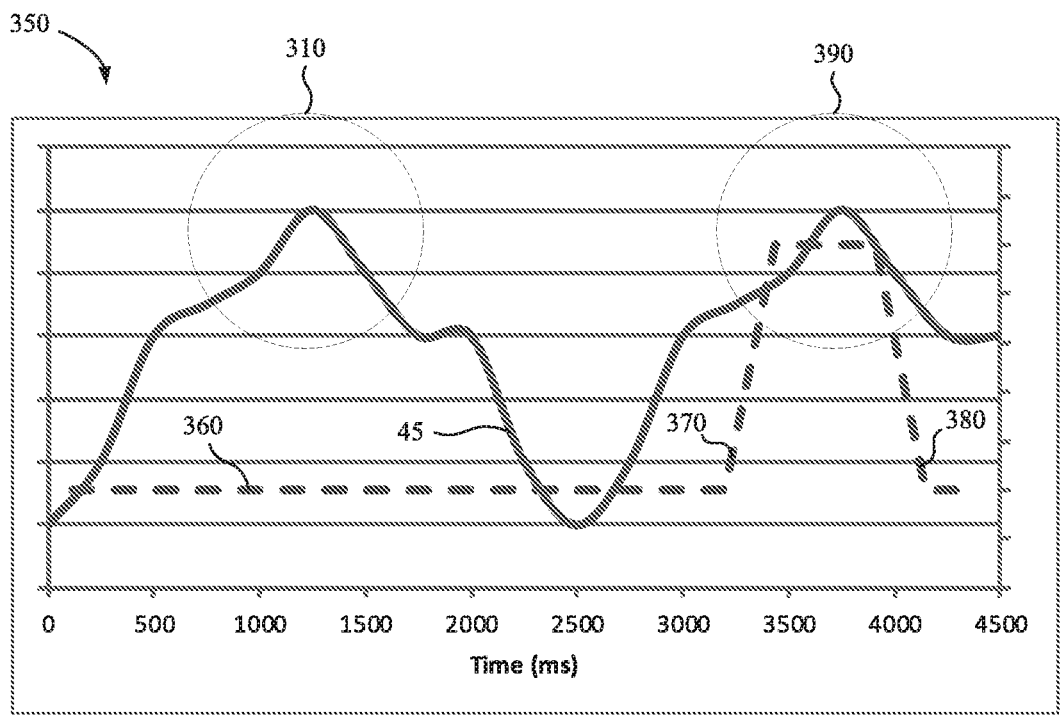
FIG. 3B is a chart illustrating physiological data and an exogenous signal in accordance with some implementations.

FIG. 3B is a chart 350 illustrating physiological data 45 (e.g., based on measured pupil dilation) and an exogenous signal 360 (e.g., a measure of ambient light at the device 10). The exogenous signal 360 corresponds to a measure of any factor or factors that could influence the physiological data. For example, the amount of ambient light at the device 10 may result in changes to the amount of dilation of the user's eyes, e.g., a decrease in ambient light may result in more dilation of the eyes, etc.

In some implementations, the physiological data 45 is adjusted or otherwise interpreted based on the exogenous signal 360. For example, the peak pattern 310 corresponding to a dilation of the user's eyes may be preliminarily interpreted as an indication of intent or interest. Since the exogenous data 360 is level during the time period of peak 310 (e.g., indicating a constant ambient light level), the determination that the dilation should be interpreted as an indication of intent or interest is accepted.

In contrast, the peak pattern 390 corresponding to a dilation of the user's eyes may similarly be preliminarily interpreted as an indication of intent or interest but this determination may be rejected. In this example, the exogenous signal 360 indicates an increase 370 followed by a decrease 380 during the same time period as the peak pattern 390. Thus, the exogenous signal could correspond to an exogenous factor (rather than an interest or intent of the user 25) that caused the peak pattern 390. Accordingly, the device 10 may reject the preliminarily interpretation of peak pattern 390 as an indication of intent or interest. In some implementations, a model is used to account for exogenous signals, e.g., the model is trained to interpret patterns in physiological data 45 that occur during the same time periods as patterns in exogenous signals.

In some implementations, exogenous signals corresponding to pupil diameter changes in the pupil dilation data result from ambient light changes, chromatic changes, accommodation of the eye, content lighting changes, cyclical pupil dilations, a change in ambient noise, or change in motion of the device. For example, an increase in ambient light may correspond to a decreased pupil diameter. Likewise, chromatic changes or changes in content lighting may correspond to increases or decreases in pupil diameter. Moreover, exogenous signals may also be related to the use of drugs or medications. For example, opiates or opioids may be associated with a narrowing of the pupil and cocaine or amphetamines may be associated with a widening of the pupil. In some implementations, based on pupillary response, the device 10 detects patterns that correspond to one or more exogenous factors, for example, based on learning such patterns using a machine learning model. The device 10 may distinguish patterns of physiological data 45 that correspond to interest or intent from patterns of physiological data 45 that correspond to exogenous factors, for example, based on learning such distinctions using a machine learning model.

In some implementations, the device 10 detects the location of the eyes 30 of the user 25 and the pupils 35 of the user 25, e.g., by processing and analyzing an image comprising light (typically infrared and/or a color produced by the red-green-blue additive color model) reflecting from one or both eyes, in order to locate and measure a diameter of the pupils. The reflected light may originate from a light projecting source of the device 10, or any other natural (e.g., sunlight) or artificial (e.g., a lamp) source. Using techniques such as detecting pupil center and corneal reflections (PCCR), the device 10 may process and analyze an image comprising light reflecting from an element of the eye 30, including the pupil 35, in order to determine the diameter of the pupil 35. Additionally, the device 10 may process light (e.g., from an illumination source on the device or elsewhere) reflected off the eye 30 of the user 25 as a glint.

In some implementations, the location and features of the head 27 of the user 25 (e.g., an edge of the eye, a nose or a nostril) are extracted by the device 10 and used in finding coarse location coordinates of the eyes 30 of the user 25, thus simplifying the determination of precise eye 30 features (e.g., position, gaze direction, etc.) and making the pupil diameter 50 measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move their head 27 and eyes 30 freely while reducing or eliminating the need to actively track the head 27 using sensors or emitters on the head 27.

By tracking the eyes 30, some implementations reduce the need to re-calibrate the user 25 after the user 25 moves their head 27. In some implementations, the device 10 uses depth information to track the pupil's 35 movement, thereby enabling a reliable pupil diameter 50 to be calculated based on a single calibration of user 25. Utilizing techniques such as pupil-center-corneal reflection (PCCR), pupil tracking, and pupil shape, the device 10 may calculate the pupil diameter 50, as well as a gaze angle of the eye 30 from a fixed point of the head 27, and use the location information of the head 27 in order to re-calculate the gaze angle. In addition to reduced recalibrations, further benefits of tracking the head 27 may include reducing the number of light projecting sources and reducing the number of cameras used to track the eye 30.

Some implementations provide the device 10 with faster, more efficient methods and interfaces for navigating through user interfaces. Such methods and interfaces may complement or replace conventional methods for navigating through user interfaces. Such methods and interfaces may reduce the cognitive burden on a user 25 and produce a more efficient human-machine interface. For battery-operated computing devices, such methods and interfaces may conserve power and increase the time between battery charges. Moreover, some implementations enhance the navigation of user interfaces based on detecting patterns associated with physiological data 45.

In accordance with some implementations, a user interface having one or more selectable objects is displayed on a screen of the device 10 and the interest or intent 40 of the user 25 is associated with one of the selectable objects. Moreover, in some implementations, the interest or intent 40 of the user 25 is associated with selecting one of the one of the selectable objects. In some implementations, the device 10 receives an input that corresponds to a first gesture and confirms the input with the identified interest or intent 40 of the user 25. In some implementations, the first gesture is received by the device 10 as voluntary data, i.e., behavior over which the user 25 has control. For example, voluntary data may be received based on the user's voice inputs, hand gestures, touch input, keystrokes, etc. In some implementations, the interest or intent 40 of the user 25 is associated with multiple types of input (i.e., multimodal) communicated with the device 10 by the user 25. For example, more than one low-commitment voluntary interactions may, in combination, be associated with the interest or intent 40 of the user 25.

In some implementations, in response to receiving an input that corresponds to the identified interest or intent 40, the device 10 searches for a target selectable object and move or otherwise alter an object selection indicator. When a target selectable object is identified, the device 10 may move an object selection indicator towards the target selectable object. When a target selectable object is not identified, moving the object selection indicator may include moving an object selection indicator in accordance with the identified user interest or intent 40.

In some implementations, the device 10 searches for the target selectable object based on the identified user interest or intent 40. In some implementations, the device 10 moves an object selection indicator in accordance with the user interest or intent 40 by calculating a trajectory of the object selection indicator based on a first identified user interest or intent 40 and then terminate the trajectory of the object selection indicator based on a second identified interest or intent 40. Moreover, when calculating a trajectory of the object selection indicator based on the identified user interest or intent 40, the device 10 may search for one or more candidate selectable objects that meet predefined candidate criteria, and when one or more candidate selectable objects are found, the device 10 may identify a respective candidate selectable object as the target selectable object. For example, the candidate selectable object may be identified as the target selectable object based on proximity of the candidate selectable object to a termination point of the trajectory (e.g., selectable object is closest to or within a predefined distance of a termination point of the trajectory).

In some implementations, when no candidate selectable objects are found, the device 10 moves the object selection indicator in accordance with the identified user interest or intent 40 to a termination point of the trajectory. In some implementations, the trajectory is calculated based on simulated physical properties of the object selection indicator. In some implementations, the object selection indicator is not visible to the user 25.

Computing devices are provided with faster, more efficient methods and interfaces for navigating through user interfaces, thereby increasing the effectiveness, efficiency, and user satisfaction with such devices. Such methods and interfaces may complement or replace conventional methods for navigating through user interfaces.

In some implementations, the device 10 uses a detected pattern of physiological data to control a function of the device 10. In some implementations, the device 10 identifies a given interactive item presented on a display of the device 10 at a point of the interest 40 of the user 25 (e.g. at a position in the direction of the user's gaze) and changes a state of the given interactive item responsively based on the identified interest or intent 40 of the user 25.

In some implementations, changing the state of the given interactive item includes performing an operation associated with the given interactive item. For example, interactive items may include menu choices that the user 25 can select to present specific content (e.g., a movie or a television show) on the display 15. In some implementations, the device 10 changes the state of a given interactive item by directing input received from the user 25 to the given interactive item. In some implementations, the device 10 identifies the given interactive item based on other data and interact with the interactive item based on the identified user interest or intent 40. For example, if the user 25 is gazing at a selectable button, the device 10 may identify the selectable button based on the user's gaze and then select the selectable button based on the identified user interest or intent 40.

In some implementations, the device 10 identifies a given interactive item presented on the display of the device 10 at a position in the direction of the user's gaze. Moreover, the device 10 may change a state of the given interactive item responsively to a spoken verbal command received from the user 25 in combination with the identified interest or intent 40 of the user 25. For example, the given interactive item may comprise an icon associated with a software application, and the user 25 may gaze at the icon and say the word "start" to execute the application. The device 10 may then use the identified interest or intent 40 of the user 25 as a confirmation of the user's verbal command. In some implementations, the device 10 is configured to identify a given interactive item responsively to the direction of the user's gaze, and to manipulate the given interactive item responsively to a gesture performed by a limb or body part (e.g., a finger or a hand). The device 10 may then confirm the gesture based on identifying user interest or intent 40. In some implementations, the device 10 removes an interactive item or object based on the identified interest or intent 40. In other implementations, the device 10 automatically captures images of the content at times when the interest or intent 40 of the user 25 is determined.

In some implementations, the device 10 is configured to provide a progressive interface. The progressive interface may aid the usability of voluntary inputs from the user 25 in combination with, or supported by, the physiological data 45 (e.g., one or more involuntary characteristics of the user 25). For example, the device 10 may provide progressive feedback to the user 25 regarding an identified interest or intent 40 of the user 25. In some implementations, the device 10 begins a low-commitment interaction with the user 25 in response to detecting a pattern of physiological data or in response to receiving voluntary user input. For example, in response to one or more lower-confidence detections of user interest or intent 40, the device 10 may perform a low-commitment interaction (e.g., highlighting or selecting an object, or displaying one or more menu items) with the user 25. In some implementations, the low-commitment interaction may direct the user 25 to progressively perform higher commitment actions to confirm the user interest or intent 40.

For example, the device 10 may act on or delete an item in response to further input from the user 25.

As a power saving feature, the device 10 may detect when the user 25 is not looking at the display and the device 10 may activate power saving techniques, e.g., disabling physiological sensors when the user 25 looks away for more than some threshold period of time. Furthermore, in some implementations, the device 10 dims or darkens the display (i.e., decrease the brightness) entirely when the user 25 is not looking at the display. When the user 25 looks back toward the display, the device 10 may deactivate the power saving techniques. In some implementations, the device 10 tracks a physiological attribute using a first sensor and then activates a second sensor to obtain the physiological data 45 based on the tracking. For example, the device 10 may use a camera to identify that the user 25 is looking in the direction of the device 10 and then activate an eye sensor when it is determined that the user 25 is looking in the direction of the device 10.

In some implementations, a combination of determining user intent and an input device 10 is used to create an interactive user interface that utilizes the input device 10 to identify an on-screen interactive item and determine the user's interest or intent 40 in interacting with the on-screen interactive item. For example, a user 25 may use a mouse to select an on-screen interactive item based on the user's determined interest or intent 40, e.g., a "mouse click" type event triggered by determining the user's interest or intent 40 rather than a mouse click. In some implementations, a combination of determining user intent and gaze tracking is used to create an interactive user interface that can detect which on-screen interactive item the user 25 is looking at (e.g., gaze tracking) and determine the user's interest or intent 40 in interacting with the on-screen interactive item, thereby obviating the need for a mouse and/or a keyboard.

Furthermore, the combination of determining user interest or intent 40 with other modalities, such as gaze tracking, facial gesture detection, 3D mapping/gesture detection and/or voice detection, enables the user 25 to control on-screen objects fully, without the use of a mouse or a touch screen. In this manner, the user 25 can perform a full range of pointing and selection functions, including searching through large numbers of information items and choices. The combined interface modalities may also be used to search and perform control functions within the context of a certain interactive item, such as performing find, cut, copy and paste functions within an open file. In some implementations, the device 10 identifies a first interest, or group of first interests, and then progressively identifies a second interest, or second group of interests, based on the previously identified interest(s).

When selecting a given interactive item, the device 10 may convey visual feedback or audio feedback to the user 25 indicating the selection (i.e., before performing an action such as presenting selecting interactive content). Examples of visual feedback include changing the size and/or appearance of the selected item or highlighting the selected item by surrounding the selected item with a border. Examples of audio feedback include non-verbal types of audio feedback (e.g., clicks, beeps, chirps, or other various types of non-verbal sound effects) as well as audio feedback with varying levels of verbosity (e.g., outputting one or several spoken words confirming a selection). In some implementations, conveying visual or audio feedback enhances the user 25 experience by signaling the user 25 that an action is being taken, or will be taken, based on the user's interest or intent 40.

In some implementations, the device 10 utilizes a training or calibration sequence to adapt to the specific physiological characteristics of a particular user 25. In some implementations, the device 10 presents the user 25 with a training scenario in which the user 25 is instructed to interact with on-screen items. By providing the user 25 with a known intent or area of interest (e.g., via instructions), the device 10 may record the user's physiological data 45 and identify a pattern associated with the user's intent or interest 40. For example, the device 10 could direct a user to mentally select the button in the center of the screen on the count of three and record the user's physiological data 45 to identify a pattern associated with the user's intent or interest 40. In some implementations, the pattern associated with the user's intent or interest 40 is stored in a user profile associated with the user and the user profile can be updated or recalibrated at any time in the future. For example, the user profile could automatically be modified over time during a user experience to provide a more personalized user experience.

Figure 4:
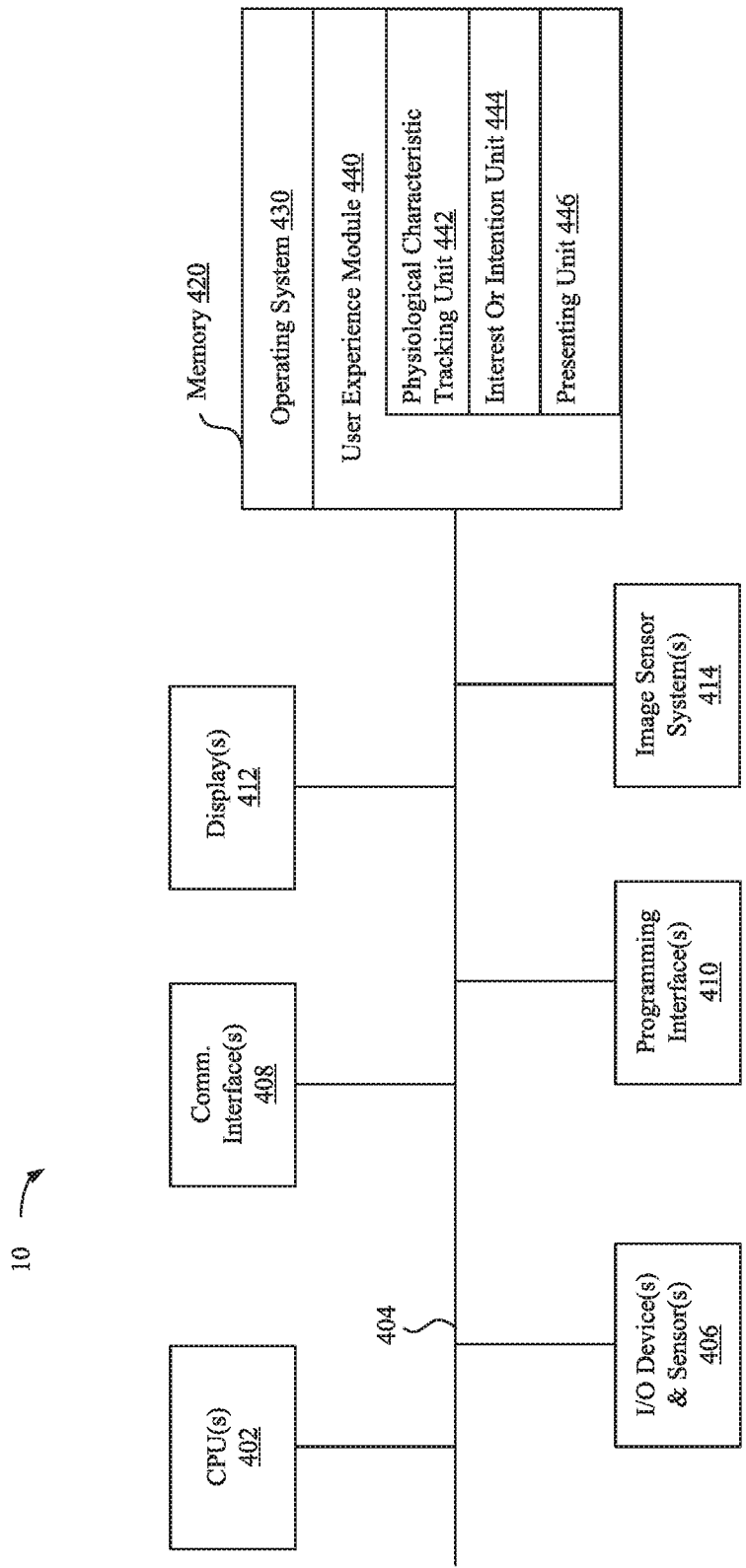
FIG. 4 is a block diagram illustrating device components of an exemplary device according to some implementations.

FIG. 4 is a block diagram of an example of a device 10 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 410, one or more displays 412, one or more interior and/or exterior facing image sensor systems 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 412 are configured to present a user experience to the user 25. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), a retinal projection system, and/or the like display types. In some implementations, the one or more displays 412 correspond to diffractive, reflective, polarized, holographic, etc. waveguide displays. In one example, the device 10 includes a single display. In another example, the device 10 includes a display for each eye of the user 25, e.g., an HMD. In some implementations, the one or more displays 412 are capable of presenting MR content, including VR or AR content.

In some implementations, the one or more image sensor systems 414 are configured to obtain image data that corresponds to at least a portion of the face of the user 25 that includes the eyes of the user 25. For example, the one or more image sensor systems 414 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 414 further include illumination sources that emit light upon the portion of the face of the user 25, such as a flash or a glint source.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a user experience module 440.

The operating system 430 includes procedures for handling various basic system services and for performing hardware dependent tasks. In some implementations, the user experience module 440 is configured to present a user experience that utilizes physiological data 45 to identify an interest or intent 40 of the user 25 via context aware dynamic distortion correction to the user 25 via the one or more input/output (I/O) devices and sensors 406. To that end, in various implementations, the user experience module 440 includes a physiological characteristic tracking unit 442, an interest or intention unit 444, and a presenting unit 446.

In some implementations, the physiological characteristic tracking unit 442 is configured to obtain physiological data (e.g., pupil dilation, electroencephalography, etc.) and to use the obtained physiological data to identify patterns of physiological data. To that end, in various implementations, the physiological characteristic tracking unit 442 includes instructions and/or logic therefor, and heuristics and metadata therefor.

In some implementations, the interest or intention unit 444 is configured to use the identified patterns of physiological data to identify the interest or intent of a user of the device. To that end, in various implementations, the interest or intention unit 444 includes instructions and/or logic therefor, and heuristics and metadata therefor.

In some implementations, the presenting unit 446 is configured to present content via the one or more displays 412 based on the identified interest or intent. To that end, in various implementations, the presenting unit 446 includes instructions and/or logic therefor, and heuristics and metadata therefor.

Although the physiological characteristic tracking unit 442, interest or intention unit 444, and presenting unit 448 are shown as residing on a single device (e.g., the device 10), it should be understood that in other implementations, any combination of these units may be located in separate computing devices.

Moreover, FIG. 4 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
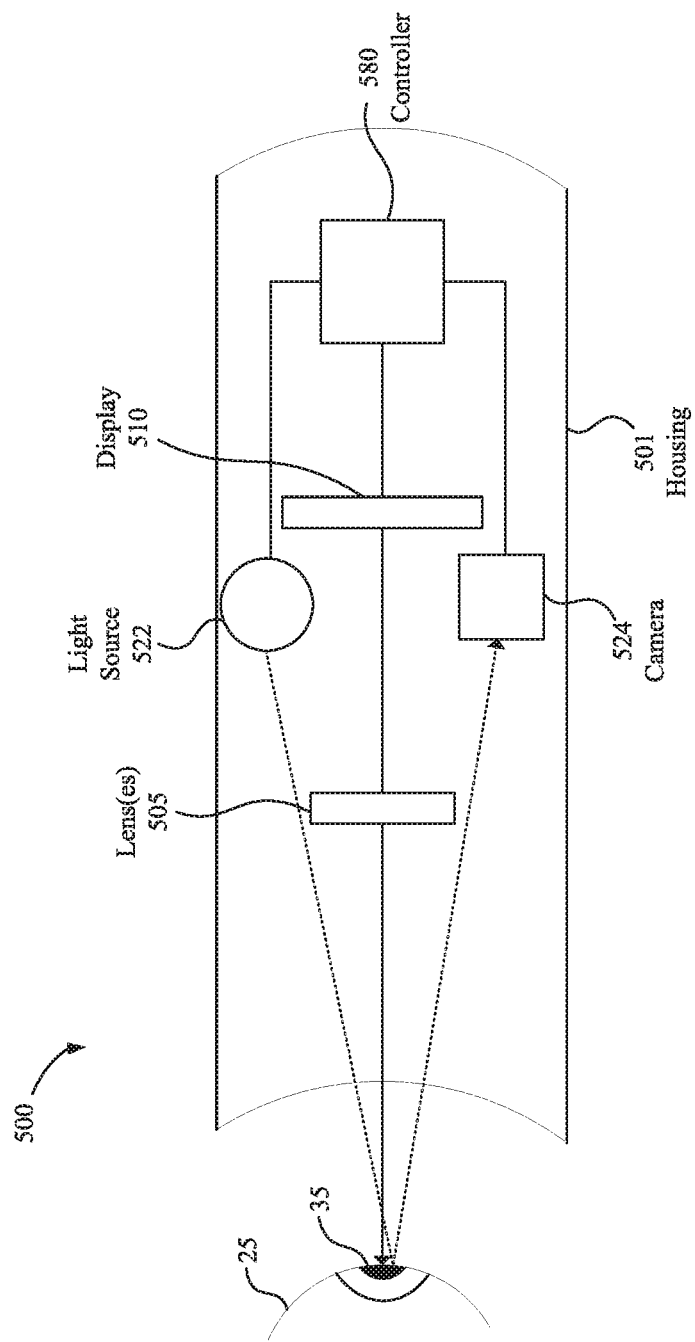
FIG. 5 is a block diagram of an example head-mounted device (HMD) in accordance with some implementations.

FIG. 5 illustrates a block diagram of an exemplary head-mounted device 500 in accordance with some implementations. The head-mounted device 500 includes a housing 501 (or enclosure) that houses various components of the head-mounted device 500. The housing 501 includes (or is coupled to) an eye pad (not shown) disposed at a proximal (to the user 25) end of the housing 501. In various implementations, the eye pad is a plastic or rubber piece that comfortably and snugly keeps the head-mounted device 500 in the proper position on the face of the user 25 (e.g., surrounding the eye of the user 25).

The housing 501 houses a display 510 that displays an image, emitting light towards or onto the eye of a user 25. In various implementations, the display 510 emits the light through an eyepiece having one or more lenses 505 that refracts the light emitted by the display 510, making the display appear to the user 25 to be at a virtual distance farther than the actual distance from the eye to the display 510. For the user 25 to be able to focus on the display 510, in various implementations, the virtual distance is at least greater than a minimum focal distance of the eye (e.g., 7 cm). Further, in order to provide a better user experience, in various implementations, the virtual distance is greater than 1 meter.

The housing 501 also houses a tracking system including one or more light sources 522, camera 524, and a controller 580. The one or more light sources 522 emit light onto the eye of the user 25 that reflects as a light pattern (e.g., a circle of glints) that can be detected by the camera 524. Based on the light pattern, the controller 580 can determine an eye tracking characteristic of the user 25. For example, the controller 580 can determine a gaze direction and/or a blinking state (eyes open or eyes closed) of the user 25. As another example, the controller 580 can determine a pupil center, a pupil size, or a point of regard. Thus, in various implementations, the light is emitted by the one or more light sources 522, reflects off the eye of the user 25, and is detected by the camera 524. In various implementations, the light from the eye of the user 25 is reflected off a hot mirror or passed through an eyepiece before reaching the camera 524.

The display 510 emits light in a first wavelength range and the one or more light sources 522 emit light in a second wavelength range. Similarly, the camera 524 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 510 by looking at it), provide foveated rendering (e.g., present a higher resolution in an area of the display 510 the user 25 is looking at and a lower resolution elsewhere on the display 510), or correct distortions (e.g., for images to be provided on the display 510).

In various implementations, the one or more light sources 522 emit light towards the eye of the user 25 which reflects in the form of a plurality of glints.

In various implementations, the camera 524 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 524 is an event camera comprising a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Figure 6:
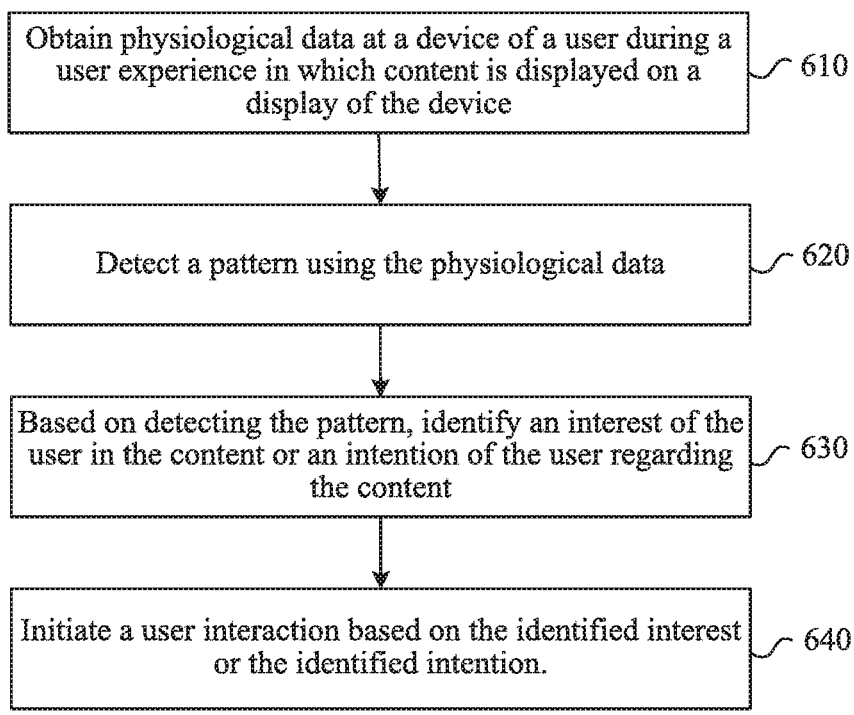
FIG. 6 is a flowchart representation of a method for initiating a user interaction based on an identified interest or an identified intention of a user where the interest or the intention is identified based on physiological data of the user obtained using a sensor during a user experience.

FIG. 6, in accordance with some implementations, is a flowchart representation of a method 600 for initiating a user interaction based on an identified interest or an identified intention of a user where the interest or the intention is identified based on physiological data of the user obtained using a sensor during a user experience. In some implementations, the method 600 is performed by one or more devices. The method 600 can be performed at a mobile device, HMD, desktop, laptop, or server device. The method 600 can be performed on an HMD that has a screen for displaying 3D images or a screen for viewing stereoscopic images. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 obtains physiological data at a device of a user during a user experience in which content is displayed on a display of the device. In some implementations, the physiological data includes electroencephalography (EEG), electrocardiography (ECG), electromyography (EMG), functional near-infrared spectroscopy (fNIRS), blood pressure, skin conductance, pupillary response, or any combination thereof. For example, physiological data may be pupillary response, where the diameter of the pupil is measured over a period of time.

In some implementations, the method 600 performs a training function by presenting the user with content and instructions directing the user's interest or intent. The method 600 may record the physiological data associated with the presentation of the content in order to identify a pattern associated with the timing of the instructed moment of intent or interest.

At block 620, the method 600 detects a pattern using the physiological data. In some implementations, the method 600 compares the physiological data obtained at block 610 to a pattern associated with user interest or intent. In some implementations, the method 600 accounts for any exogenous signals that may affect detecting a pattern. For example, increased ambient light may result in an exogenous signal affecting pupillary response.

At block 630, the method 600 identifies an interest of the user in the content or an intention of the user regarding the content based on detecting the pattern. In some implementations, as the user interacts with the device, the device detects the pattern associated with step 620 in order to identify a current interest or intent of the user. In some implementations, the current interest on intent is a selectable object displayed on the screen of the device. Moreover, the interest or intent may be identified based on the identified pattern in combination with another input, e.g., confirming an intention of a hand gesture by identifying a pattern associated with physiological data.

At block 640, the method 600 initiates a user interaction based on the identified interest or the identified intention. In some implementations, the user interaction includes moving an object selection indicator, selecting an object, changing a state of an interactive item, making a record of the object of interest or intent, or otherwise performing an operation associated with a given interactive item. For example, confidence in a user's current interest level or intention to interact may result in a discrete user interaction (e.g., a "click"-like event) or continuous user action spanning a period of time (e.g., a lingering event).

The present disclosure contemplates that users will be provided with an option to benefit from any use of physiological data 45 to identify user intention or interest, improve a user interface, or otherwise improve a user experience. For example, a user may tailor device preferences to select whether or not to use physiological data to enhance a user experience. Moreover, a user may be provided with an option to select actions or types of actions that may or may not be invoked automatically based on any use of physiological data 45.

The present disclosure further contemplates that the entities responsible for the collection, analysis, disclosure, transfer, storage, or other use of such personal information and/or physiological data 45 will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates scenarios in which users selectively block the use of, or access to, personal information data and/or physiological data 45. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data including physiological data 45 to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data. For example, content can be selected and delivered to users by inferring preferences based on non-personal information data or a bare minimum amount of personal information, such as the content being requested by the device 10 associated with a user 25, other non-personal information available to the content delivery services, or publicly available information.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device comprising a processor, a computer-readable storage medium, a display, and a sensor:
   obtaining physiological data of a user during a user experience in which content is displayed on the display, the physiological data obtained using the sensor and varying over time during the user experience;
   detecting a pattern using the physiological data;
   based on the detecting of the pattern, identifying an interest or an intention of the user to interact with an item in the content, wherein the identifying is based on:
   identifying the item based on a gaze direction, wherein the item is a selectable item; and
   identifying the interest or intention based on a verbal command, wherein the interest or intention is an interest or intention to select the selectable item and the verbal command is confirmed based on detecting the pattern using the physiological data, wherein the pattern is a pupil dilation pattern; and
   initiating a user interaction with the item based on identifying the interest or intention.

2. The method of claim 1, wherein:
   the physiological data is pupil dilation data representing a time-varying pupil diameter; and
   detecting the pattern comprises detecting the pupil dilation pattern.

3. The method of claim 2, wherein detecting the pupil dilation pattern comprises accounting for exogenous signals corresponding to pupil diameter changes in the pupil dilation data resulting from ambient light changes, chromatic changes, accommodation of the eye, content lighting changes, cyclical pupil dilations, a change in ambient noise, or change in motion of the device.

4. The method of claim 1, wherein detecting the pattern comprises applying a machine learning technique trained to identify patterns in physiological data corresponding to user interests or user intentions.

5. The method of claim 1, wherein the physiological data represents involuntary data.

6. The method of claim 1, further comprising obtaining voluntary data, wherein identifying the interest or intention is further based on the voluntary data.

7. The method of claim 6, wherein the voluntary data comprises:
   a gesture of a body part detected by an image sensor during the user experience;
   a voice command of a voice detected by a sound sensor during the user experience;
   a fixed gaze detected by an eye sensor during the user experience;
   a sequence of gaze patterns detected by an eye sensor during the user experience;
   a head movement;
   a movement detected by a motion sensor during the user experience;
   a facial expression detected by an image sensor during the user experience; or
   an attribute included in the content.

8. The method of claim 1, further comprising progressively identifying related interests or intentions based on previously identified interests or previously identified intentions during the user experience.

9. The method of claim 1, further comprising determining a confidence in the identified interest or the identified intention based on previously identified interests or previously identified intentions during the user experience.

10. The method of claim 1, wherein identifying the intention comprises identifying an intent to execute a movement, make a decision, or select a target in the content at a particular instant in time or at future time.

11. The method of claim 1, wherein identifying the intention comprises:
    receiving data regarding a voluntary user movement; and
    interpreting the voluntary user movement as an intention to interact with the content based on involuntary data in the physiological data.

12. The method of claim 1, wherein identifying the interest comprises identifying an interest in a particular object in the content at a particular instant in time or at a future time.

13. The method of claim 1, wherein initiating the user interaction comprises:
providing additional content association with an object in the content corresponding to the identified interest or the identified intention;
removing an object in the content based on the identified interest or the identified intention; or
automatically capturing images of the content at times during the user experience determined based on the identified interest or the identified intention.

14. The method of claim 1, wherein detecting the pattern comprises:
tracking a physiological attribute associated with the physiological data using a first sensor; and
activating a second sensor to obtain the physiological data based on the tracking.

15. The method of claim 1, wherein the physiological data comprises electroencephalography (EEG) data of functional near infrared spectroscopy signal (fNIRS).

16. The method of claim 1, further comprising receiving informed consent of the user to obtain the physiological data or voluntary data of the user.

17. The method of claim 1, wherein the user interaction performs an operation associated with the item.

18. The method of claim 1, wherein the user interaction directs input received from the user to the item.

19. The method of claim 1, wherein the user interaction is further based on identifying the item based on data separate from the physiological data.

20. The method of claim 1, wherein the user interaction with the item is based on:
identifying the item based on a gaze direction, wherein the item is a selectable item; and
identifying the interest or intention based on detecting the pattern, wherein the interest or intention is an interest or intention to select the selectable item and the pattern is a pupil dilation pattern.

21. A system comprising:
an electronic device with a display and a sensor;
a processor; and
a computer-readable storage medium comprising instructions that upon execution by the processor cause the system to perform operations, the operations comprising:
obtaining physiological data of a user during a user experience in which content is displayed on the display, the physiological data obtained using the sensor and varying over time during the user experience;
detecting a pattern using the physiological data;
based on the detecting of the pattern, identifying an interest or an intention of the user to interact with an item in the content, wherein the identifying is based on:
identifying the item based on a gaze direction, wherein the item is a selectable item; and
identifying the interest or intention based on a verbal command, wherein the interest or intention is an interest or intention to select the selectable item and the verbal command is confirmed based on detecting the pattern using the physiological data, wherein the pattern is a pupil dilation pattern; and
initiating a user interaction with the item based on identifying the interest or intention.

22. The system of claim 21, wherein:
the physiological data is pupil dilation data representing a time-varying pupil diameter; and
detecting the pattern comprises detecting the pupil dilation pattern, wherein detecting the pupil dilation pattern comprises accounting for exogenous signals corresponding to pupil diameter changes in the pupil dilation data resulting from ambient light changes, chromatic changes, accommodation of the eye, content lighting changes, cyclical pupil dilations, a change in ambient noise, or change in motion of the device.

23. The system of claim 21, wherein the electronic device is a head-mounted-device (HMD).

24. A non-transitory computer-readable storage medium storing program instructions that are computer-executable to perform operations comprising:
obtaining physiological data of a user during a user experience in which content is displayed on a display, the physiological data obtained using the sensor and varying over time during the user experience;
detecting a pattern using the physiological data;
based on the detecting of the pattern, identifying an interest or an intention of the user to interact with an item in the content, wherein the identifying is based on:
identifying the item based on a gaze direction, wherein the item is a selectable item;
identifying the interest or intention based on a verbal command, wherein the interest or intention is an interest or intention to select the selectable item and the verbal command is confirmed based on detecting the pattern using the physiological data, wherein the pattern is a pupil dilation pattern; and
initiating a user interaction with the item based on identifying the interest or intention.

* * * * *